United States Patent
Banks

[19]

[11] Patent Number: 6,038,756
[45] Date of Patent: Mar. 21, 2000

[54] METHOD OF MOUNTING A SUSPENSION BUMPER

[75] Inventor: Alan James Banks, Chelmsford, United Kingdom

[73] Assignee: Ford Global Technologies, Inc., Dearborn, Mich.

[21] Appl. No.: 09/016,912

[22] Filed: Feb. 2, 1998

[51] Int. Cl.[7] .............................. B23P 11/02; B23P 19/02
[52] U.S. Cl. ................................ 29/453; 29/235
[58] Field of Search ............................ 29/235, 451, 453, 29/897.2, 896.93

[56] References Cited

U.S. PATENT DOCUMENTS

| | | | |
|---|---|---|---|
| 204,913 | 6/1878 | Pratt | 29/235 U X |
| 1,915,249 | 6/1933 | Jorgensen | 29/235 |
| 2,585,438 | 2/1952 | Clingman | 29/453 |
| 2,924,008 | 2/1960 | Haushalter | 29/235 |
| 2,961,755 | 11/1960 | Prince | 29/235 |
| 4,532,690 | 8/1985 | Del Bon et al. | |
| 4,958,849 | 9/1990 | Pinch et al. | |
| 5,158,269 | 10/1992 | Hein et al. | |
| 5,248,134 | 9/1993 | Ferguson et al. | |
| 5,957,822 | 9/1999 | Bienhaus et al. | 29/453 X |

*Primary Examiner*—S. Thomas Hughes
*Assistant Examiner*—Eric Compton
*Attorney, Agent, or Firm*—Gregory P. Brown

[57] ABSTRACT

A method of mounting a suspension bumper (10) in a motor vehicle providing a high degree of manufacturing confidence. The method includes inserting a first end (54) of an installation tool (50) in a blind bore (20) of the suspension bumper; aligning a retaining tip (40) with an aperture (44) in the vehicle; applying an insertion force (60) on the suspension bumper to compress the retaining tip through the aperture and allow a retaining groove (48) to engage a periphery (49) of the aperture; and applying a withdrawal force in a direction opposite from the insertion force sufficient to remove the installation tool from the suspension bumper, the withdrawal force being smaller in magnitude than a force required to disengage the retaining groove from the periphery.

7 Claims, 2 Drawing Sheets

METHOD OF MOUNTING A SUSPENSION BUMPER

BACKGROUND OF THE INVENTION

1. Field of the Invention

The present invention relates generally to resilient bumpers used in suspensions of motor vehicles. More particularly the present invention relates to a method of mounting a suspension bumper in a motor vehicle.

2. Disclosure Information

Suspension bumpers are blocks of resilient material placed between two members having relative motion therebetween. The suspension bumper prevents the two members from directly contacting each other, which can produce undesirable noise and harshness to the operator and passengers of the vehicle. Instead, the bumper is attached to one of the members such that the other member contacts the bumper and compresses it, thereby preventing member to member contact.

It is known to secure the suspension bumper to the member by including a threaded fastener or providing a snap in relationship. The snap-in suspension bumpers are preferred over those requiring threaded fasteners because they are generally faster and simpler to install and less expensive. On the other hand, once installed, the threaded fastener suspension bumpers provide great confidence to the manufacturer that they have been installed properly. Field studies show that the snap-in suspension bumpers can appear to be properly installed when in fact they are not fully snapped in, resulting in their falling out prematurely.

It would be desirable therefore to overcome the uncertainties associated with installing the lower cost, simpler snap-in suspension bumpers by providing a suspension bumper having the manufacturing installation confidence like that of the more complex and expensive threaded fastener suspension bumpers.

SUMMARY OF THE INVENTION

A method of mounting a suspension bumper has been discovered that overcomes the deficiencies of previous snap-in suspension bumpers. The present invention provides an improvement over known snap-in suspension bumpers by providing an installation tool that necessarily applies a predetermined minimum withdrawal force sufficient to remove the suspension bumper if it were not properly installed.

Specifically, the present invention provides a method of mounting a suspension bumper to a structural member on a motor vehicle, the method comprising the steps of:

(a) providing an aperture in the structural member for receiving the suspension bumper;

(b) providing a blind bore axially extending from an open end to a closed end on the suspension bumper;

(c) inserting a first end of an installation tool in the blind bore;

(d) providing a resilient retaining tip on an outer surface of the closed end of the suspension bumper, the resilient tip having an uncompressed sectional area greater than the aperture in the structural member and a retaining groove having a sectional area substantially equal to aperture;

(e) aligning the retaining tip with the aperture;

(f) applying an insertion force on the suspension bumper with the installation tool to compress the retaining tip through the aperture in the structural member and allow the retaining groove to engage a periphery of the aperture; and (g) applying a withdrawal force on the installation tool in a direction opposite from the insertion force sufficient to remove the installation tool from the blind bore, the withdrawal force being smaller in magnitude than a force required to remove the retaining tip from the aperture.

It is an advantage of the present invention to provide a simple, low cost suspension bumper capable of providing great installation confidence than was previously known possible.

DETAILED DESCRIPTION OF THE PREFERRED EMBODIMENT

Figure 1:
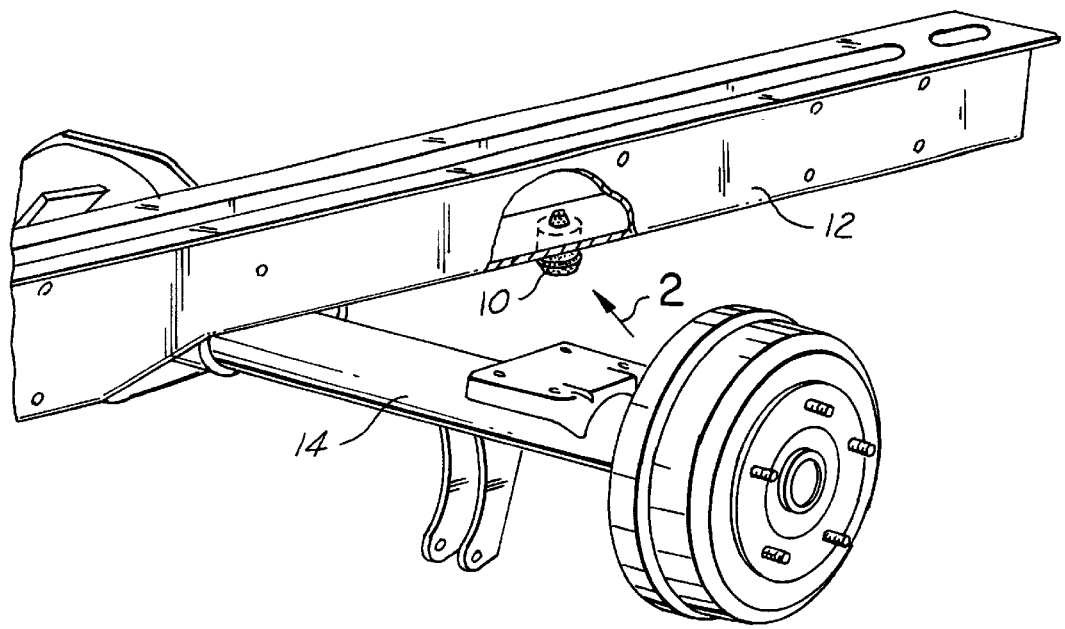
FIG. 1 is an isometric view of a motor vehicle suspension and a structural member in accordance with the present invention.
Figure 2:
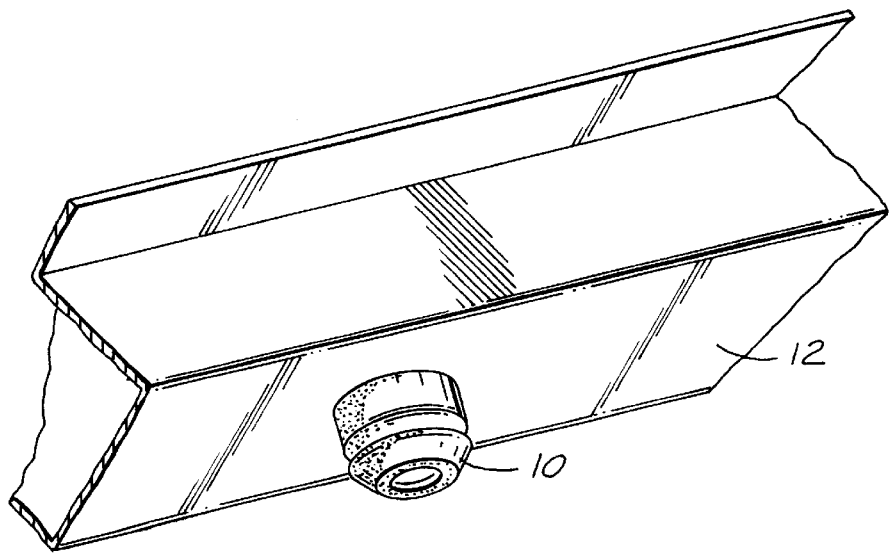
FIG. 2 is an isometric view of a motor vehicle structural member having a suspension bumper installed in accordance with the present invention.

Referring now to FIGS. 1 and 2, a suspension bumper 10 installed in a motor vehicle is shown. The motor vehicle includes a structural member 12 which may be either a frame rail in a vehicle having body on frame or subframe construction or the structural member may be a component of a unitized body structure. It should further be noted that the present invention applies to installing a suspension bumper on the suspension member itself, as an equivalent alternative to the presently preferred and described embodiment. The motor vehicle includes a suspension member 14 which, under certain conditions, articulates sufficient to directly contact the suspension bumper 10.

Figure 3:
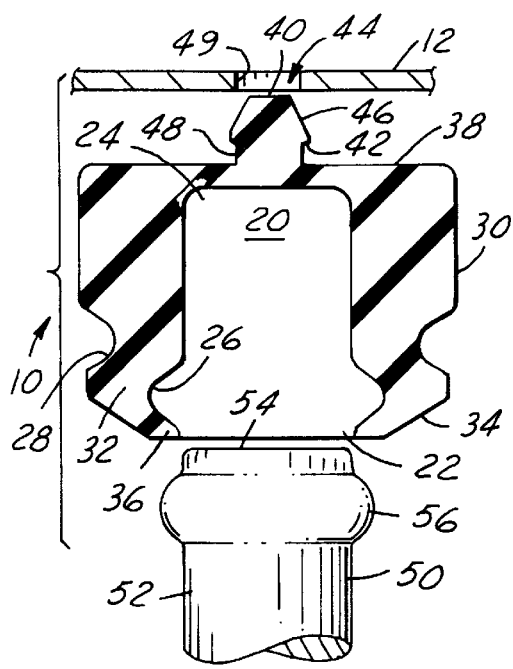
FIG. 3 is a partial sectional view of a suspension bumper being installed in accordance with the present invention.
Figure 4:
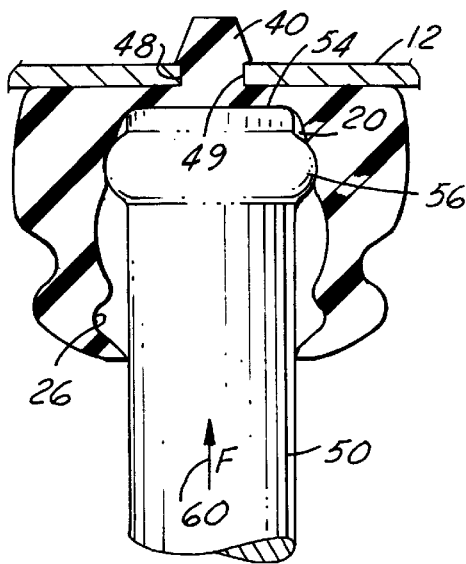
FIG. 4 is a partial sectional view of a suspension bumper being installed in accordance with the present invention.
Figure 5:
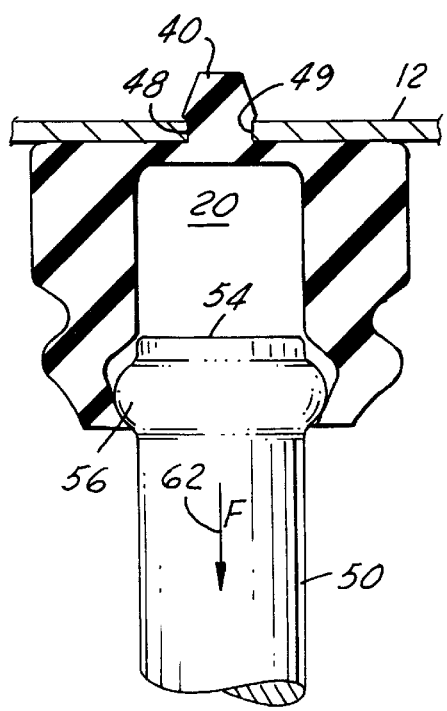
FIG. 5 is a partial sectional view of a suspension bumper being installed in accordance with the present invention.
Figure 6:
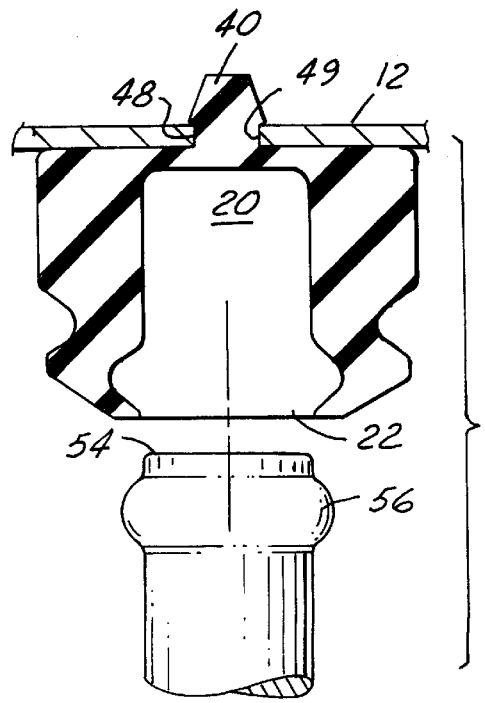
FIG. 6 is a partial sectional view of a suspension bumper being installed in accordance with the present invention.

Referring now to FIG. 3, the suspension bumper 10 is generally cylindrical, however it could have any shape, and includes a blind bore 20 axially extending from a open end 22 to a closed end 24. An internal groove 26 is formed in the blind bore adjacent to open end. The internal groove 26 may extend continuously around the circumference of the of the blind bore as illustrated, or, alternatively, it may be discontinuous. Additionally the radii forming the groove will vary depending on the design, as will be discussed below. The outer surface 30 of the open end 22 of the suspension bumper 10 includes a taper 34 forming a ring 36 having reduced material thickness around its perimeter.

The suspension bumper also includes an external groove 28 formed on an outer surface 30 axially between the internal groove 26 and the closed end 24. The external groove may also extend continuously around the outer circumference of the suspension bumper, as illustrated. In the preferred embodiment, the external groove 28 is substantially adjacent to the internal groove 26 forming a hinge portion 32 between the internal groove 26 and the external groove 28.

The closed end 24 of the suspension bumper 10 includes an outer surface 38 which abuts against the structural member 12 when installed. In the preferred embodiment, the outer surface 38 of the closed end 24 is generally planar, however, it could include protrusions (not shown) to restrain movement of the bumper against the structural member 12. The outer surface 38 of the closed end 24 also includes a resilient retaining tip 40 having an uncompressed outer diameter 42 larger than a diameter in a similarly shaped aperture 44. In the preferred embodiment, the retaining tip 40 is cylindrical and includes a cone shaped portion 46 for simplifying insertion of the retaining tip in the aperture 44. It should be noted that it is the relationship between the size of the sectional area of the retaining tip and the corresponding aperture that dictates their functional interaction, not necessarily their shape.

The retaining tip 40 further includes a retaining groove 48 disposed between the uncompressed outer diameter 42 and the outer surface 38 of the closed end 24, preferably adjacent to the outer surface 38. The retaining groove has a sectional area substantially equal to that of the aperture 44 to allow a close fitting relationship with the periphery 49 of the aperture 44 to provide tight fitting retention of the suspension bumper 10 on the structural member 12.

An installation tool 50, which may be hand driven or machine driven, includes a mandrel portion 52 having a first end 54 for insertion in the blind bore 20 of the suspension bumper 10. The outer diameter of the mandrel portion is selected to form a predetermined interference fit with the diameter of the blind bore. Additionally, the interference fit may be enhanced by including a radially protruding ridge 56 adjacent to the first end 54 for snap engagement with the internal groove 26.

The suspension bumper 10 may be made of any sufficiently resilient material having the properties desired for such an application. Traditionally, natural rubber has worked well in such an environment, however, synthetic materials are becoming available that provide improved durability under certain applications. One example of such a synthetic is Microvon™ made by Dunlop.™ The materials stiffness may also vary depending upon the application, however, it has been determined that if the material thickness and stiffness are selected to allow the mandrel portion 52 to be fully inserted within the blind bore 20 during installation the forces required can be reduced, making the process easier for a manufacturing operator.

Referring now to FIGS. 2–6, operation of the present invention will now be described. An operator first inserts the first end of the installation tool into the blind bore. The resilient ring 36 flexes under light compressive force to help guide the first end into the blind bore. The ridge 56 snaps into the internal groove 26 and the operator then aligns the retaining tip 40 so it is adjacent with the aperture 44. The operator then applies an insertion force 60 on the suspension bumper with the installation tool sufficient to compress the outer diameter 42 of the retaining tip through the aperture 44 and snapping the retaining groove 48 into a tight fitting relationship with the periphery 49 of the aperture 44.

The operator then applies a withdrawal force 62 on the installation tool 50 in a direction opposite from the insertion force 60 sufficient to remove the first end 54 from the blind bore 20. The interference fit between the installation tool 50 and the blind bore 20 is such that the withdrawal force 62 is less than the force required to withdraw the retaining tip 40 from the aperture 44 if the retaining groove 48 is properly engaged with the periphery 49. However, the interference fit requires a predetermined minimum withdrawal force such that if the retaining groove 48 is not properly engaged with the periphery 49, the entire suspension bumper 10 will not come off the installation tool. This allows the operator a high level of confidence that the suspension bumper has been properly installed. This form of confidence is referred to as a "go" or "no-go", and is very desirable from a manufacturing standpoint.

Various modifications and variations will no doubt occur to those skilled in the art to which this invention pertains. Those and all other variations which basically rely on the teachings by which this disclosure has advanced the art are properly considered within the scope of this invention as defined by the appended claims.

We claim:

1. A method of mounting a suspension bumper to a structural member on a motor vehicle, the method comprising the steps of:

(a) providing an aperture in the structural member for receiving the suspension bumper;

(b) providing a blind bore axially extending from an open end to a closed end on the suspension bumper;

(c) inserting a first end of an installation tool in said blind bore;

(d) providing a resilient retaining tip on an outer surface of said closed end of the suspension bumper, said resilient tip having an uncompressed sectional area greater than said aperture in the structural member and a retaining groove having a sectional area substantially equal to aperture;

(e) aligning said retaining tip adjacent with said aperture;

(f) applying an insertion force on the suspension bumper with said installation tool to compress said retaining tip through said aperture in the structural member and allow said retaining groove to engage a periphery of said aperture;

(g) applying a withdrawal force on said installation tool in a direction opposite from said insertion force sufficient to remove said installation tool from said blind bore, said withdrawal force being smaller in magnitude than a force required to remove said retaining tip from said aperture; and (h) providing an interference fit between said blind bore and said first end of said insertion tool such that said withdrawal force exceeds a predetermined minimum sufficient to withdraw the suspension bumper if said retaining groove fails to completely engage said periphery of said aperture.

2. The method specified in claim 1, wherein said aperture is in the form of a circular aperture having a first diameter.

3. The method specified in claim 1, wherein said step of providing an interference fit further comprise providing a radial protruding ridge on said installation tool adjacent to said first end.

4. The method specified in claim 3, wherein said step of providing an interference fit further comprises providing an internal circumferential groove in said blind bore.

5. The method specified in claim 4, wherein said step of providing an interference fit further comprises providing an external groove on an outer surface of the suspension bumper, said external groove being axially disposed along said suspension bumper between said closed end and said internal groove.

6. The method specified in claim 5, wherein said external groove is disposed adjacent to said internal groove, operatively forming a hinge portion therebetween for controlling said withdrawal force.

7. The method specified in claim 2, wherein said retaining tip includes a cone shaped portion to aid insertion of said retaining tip in said aperture of said structural member.

* * * * *